United States Patent
Yasutomi et al.

(10) Patent No.: US 7,321,420 B2
(45) Date of Patent: Jan. 22, 2008

(54) SURVEY SYSTEM

(75) Inventors: Satoshi Yasutomi, Matsuda-machi (JP); Minoru Chiba, Matsuda-machi (JP); Nobuyuki Nishita, Matsuda-machi (JP)

(73) Assignee: Sokkia Co., Ltd., Atsugi-shi (JP)

( * ) Notice: Subject to any disclaimer, the term of this patent is extended or adjusted under 35 U.S.C. 154(b) by 21 days.

(21) Appl. No.: 11/365,823

(22) Filed: Mar. 2, 2006

(65) Prior Publication Data
US 2006/0197944 A1   Sep. 7, 2006

(30) Foreign Application Priority Data
Mar. 3, 2005   (JP) .............................. 2005-058979

(51) Int. Cl.
*G01B 11/26* (2006.01)
(52) U.S. Cl. .................................. 356/141.3
(58) Field of Classification Search .............. 356/141.3
See application file for complete search history.

(56) References Cited

U.S. PATENT DOCUMENTS 6,144,761 A * 11/2000 Kaneko et al. ............. 382/154
2005/0254044 A1* 11/2005 Sugiura et al. .......... 356/141.1

FOREIGN PATENT DOCUMENTS

| JP | 3075384 | 6/2000 |
|---|---|---|
| JP | 2003-346645 | 12/2000 |
| JP | 2003-273471 | 9/2003 |

* cited by examiner

*Primary Examiner*—Thomas H. Tarcza
*Assistant Examiner*—Luke D. Ratcliffe
(74) *Attorney, Agent, or Firm*—Westerman, Hattori, Daniels & Adrian, LLP.

(57) ABSTRACT

[Problem] In a surveying instrument that automatically tracks or collimates a target, the target that is moved to a measurement point and is placed there can be found in the shortest possible time.

[Solution Means] In a survey system made up of a target (60) and a surveying instrument (50) that automatically tracks or collimates the target, the target is provided with a direction angle sensor (86) that measures a surveying-instrument direction angle (θta, θtb) obtained when the target is directed toward the surveying instrument, whereas the surveying instrument is provided with a horizontal angle measuring portion that measures a target direction angle (θsa, θsb, θsc) indicating the direction of the target. An estimated target direction angle (θsb) is calculated from an angular difference (θ$_o$) between the surveying-instrument direction angle (θta) and the target direction angle (θsa) obtained at the last measurement and from the surveying-instrument direction angle (θtb) obtained at the present measurement. The instrument body (52) is directed in the direction of the estimated target direction angle.

6 Claims, 4 Drawing Sheets

SURVEY SYSTEM

TECHNICAL FIELD

The present invention relates to a surveying instrument that can automatically track a target and can automatically collimate the target.

BACKGROUND ART

In order to measure the position of a survey point or the like by using a conventional surveying instrument such as a total station (electric distance/angle meter), it was necessary to collimate a target placed at the survey point. In recent years, a surveying instrument having an automatic collimator has appeared on the market, in order to reduce the labor of an operator collimating a target. The surveying instrument having such an automatic collimator has come to include a remote control device so that a survey can be performed by a single operator. However, the surveying instrument provided with the automatic collimator has a conventional problem in the fact that a collimation telescope must scan a wide range in order to set the target within a narrow visual field of the telescope, and hence much time is consumed for automatic collimation and for the survey.

To solve the problem, an automatic tracking type surveying instrument that automatically tracks a target has also appeared on the market (see Patent Document 1 mentioned below). The conventional automatic tracking type surveying instrument is characterized in that tracking light is emitted along the collimation axis (optical axis) of a collimation telescope when a target is moved, and the direction of the target is calculated by receiving the tracking light reflected by the target while allowing the collimation telescope to always continue to be automatically directed toward the target

[Patent Document 1] Japanese Published Unexamined Patent Application No. 2004-132914

DISCLOSURE OF THE INVENTION

[Problems To Be Solved By The Invention]

However, disadvantageously, the automatic tracking type surveying instrument disclosed by Patent Document 1 occasionally loses sight of the target when the target is being moved or when an obstacle or the like lies between the surveying instrument and the target. An unsolved problem resides in the fact that the visual field of the collimation telescope of the surveying instrument is narrow in this case, and hence much time is consumed to again set the target in the visual field of the collimation telescope, and the time required for the survey cannot be shortened even by using the automatic tracking type surveying instrument. To prevent the occurrence of this problem, an operator is required to pay close attention so that the target always continues to be viewed from the surveying instrument. However, disadvantageously, this increases a burden imposed on the operator.

The present invention has been made in consideration of these problems, and it is an object of the present invention to provide a surveying instrument that automatically tracks or collimates a target and that can find the target moved to and placed at a measurement point in the shortest possible time.

[Means For Solving The Problems]

To solve the problems, the invention according to claim 1 is characterized in that, in a survey system comprising a target and a surveying instrument that automatically tracks or collimates the target, the target comprises a direction angle sensor that measures a surveying-instrument direction angle obtained when the target is directed toward the surveying instrument; and a measurement command means for transmitting the surveying-instrument direction angle and a measurement command to the surveying instrument, and the surveying instrument comprises an angle measuring means for measuring a target direction angle that indicates a direction of the target; a measurement means for automatically collimating the target and performing measurement when the measurement command is received; an angular-difference calculating means for calculating an angular difference between the surveying-instrument direction angle and the target direction angle; a target-direction-angle estimating means for calculating an estimated target direction angle from the angular difference calculated at the last measurement and from the surveying-instrument direction angle transmitted from the target at the present measurement; and a rotation means for directing a body of the surveying instrument in a direction of the estimated target direction angle.

The invention according to claim 2 is characterized in that, in a survey system comprising a target and a surveying instrument that automatically tracks or collimates the target, the target comprises a direction angle sensor that measures a surveying-instrument direction angle obtained when the target is directed toward the surveying instrument; an angular-difference calculating means for calculating an angular difference between the surveying-instrument direction angle and a target direction angle that indicates a direction of the target transmitted from the surveying instrument; a target-direction-angle estimating means for calculating an estimated target direction angle from the angular difference calculated at the last measurement and from the surveying-instrument direction angle obtained when the target is directed toward the surveying instrument at the present measurement; and a measurement command means for transmitting a measurement command including the estimated target direction angle to the surveying instrument, and the surveying instrument comprises an angle measuring means for measuring a target direction angle; a measurement means for automatically collimating the target and performing measurement when the measurement command is received; a measured-value transmitting means for transmitting the target direction angle to the target; and a rotation means for directing a body of the surveying instrument in a direction of the estimated target direction angle.

The invention according to claim 3 is characterized in that, in the invention according to claim 1 or 2, the rotation means determines a rotational direction having a smaller angular difference selected from between a clockwise angular difference and a counterclockwise angular difference, concerning a present direction angle at which the body of the surveying instrument is directed and the estimated target direction angle.

The invention according to claim 4 is characterized in that, in the invention according to claim 1, or 2, or 3, the angular-difference calculating means calculates a representative value of angular differences that have hitherto been obtained whenever the angular differences are calculated, and the target-direction-angle estimating means uses the representative value as the angular difference.

The invention according to claim 5 is characterized in that, in the invention according to claim 1, or 2, or 3, or 4, the target includes a guide light transmitter that emits guide light indicating a direction of the target, and the surveying instrument includes a direction detector that detects the direction of the target by receiving the guide light.

The invention according to claim 6 is characterized in that, in the invention according to claim 1, or 2, or 3, or 4, or 5, the direction angle sensor is a magnetic sensor.

[Effects Of The Invention]

According to the invention of claim 1, an angular difference is calculated between the target direction angle measured by the surveying instrument and the surveying-instrument direction angle measured by the target at the last measurement, and an estimated target direction angle for the present measurement is calculated from the surveying-instrument direction angle measured by the target at the present measurement performed after the target has been moved and from the angular difference calculated at the last measurement, whereby the instrument body can be directed in the direction of the estimated target direction angle at once. Therefore, the surveying instrument can find the target placed at the measurement point in a short time, can complete the measurement, and can perform an efficient surveying operation. Since the automatic tracking type surveying instrument has, of course, no problem even if it loses sight of the target, a burden imposed on the operator is lessened.

According to the invention of claim 2, like the invention according to claim 1, an angular difference is calculated between the target direction angle measured by the surveying instrument and the surveying-instrument direction angle measured by the target at the last measurement, and an estimated target direction angle for the present measurement is calculated from the surveying-instrument direction angle measured by the target at the present measurement performed after the target has been moved and from the angular difference calculated at the last measurement, whereby the instrument body can be directed in the direction of the estimated target direction angle at once. Therefore, the same effect as in the invention according to claim 1 is fulfilled.

According to the invention of claim 3, additionally, the rotation means determines a rotational direction having a smaller angular difference selected from between a clockwise angular difference and a counterclockwise angular difference, concerning a present direction angle at which the body of the surveying instrument is directed and the estimated target direction angle. Therefore, since the surveying instrument catches the target by rotating the instrument body by the minimum rotation angle, the time required for the measurement can be made shorter.

According to the invention of claim 4, additionally, the angular-difference calculating means calculates a representative value (e.g., an average value and a weighted average) of angular differences that have hitherto been obtained whenever the angular differences are calculated, and the target-direction-angle estimating means uses the representative value as the angular difference. Therefore, the accuracy of the angular difference improves, and the target direction angle can be estimated more accurately after the target has been moved. Therefore, the target can be caught more swiftly, and the time required for the measurement can be made even shorter. Since the influence of numerical values deviating extremely from an average value is removed especially by using a weighted average, the accuracy of the angular difference becomes even higher, and the target direction angle can be accurately estimated after the target has been moved. Therefore, the target can be caught more swiftly, and the time required for the measurement can be made even shorter.

According to the invention of claim 5, additionally, the target includes a guide light transmitter that emits guide light indicating a direction of the target, and the surveying instrument includes a direction detector that detects the direction of the target by receiving the guide light. Therefore, the surveying instrument can find the target more swiftly, and the time required for the measurement can be made even shorter.

According to the invention of claim 6, additionally, the direction angle sensor is a magnetic sensor. Therefore, the present invention can be accomplished at low cost and easily.

[Best Mode For Carrying Out The Invention]

Embodiments of the present invention will be hereinafter described in detail with reference to the accompanying drawings.

Figure 1:
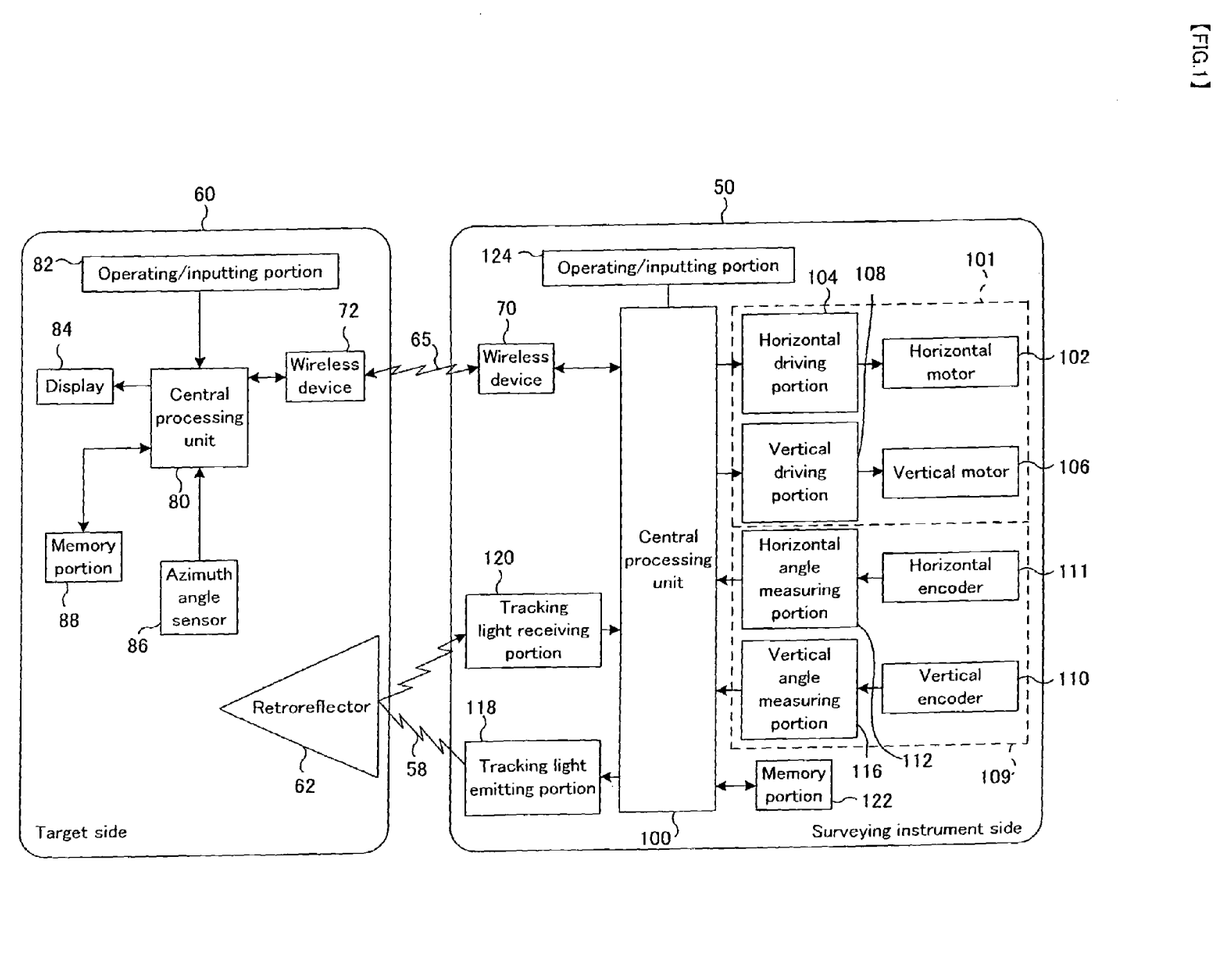
[FIG. 1] Block diagram of the whole of the survey system according to the first embodiment of the present invention.
Figure 2:
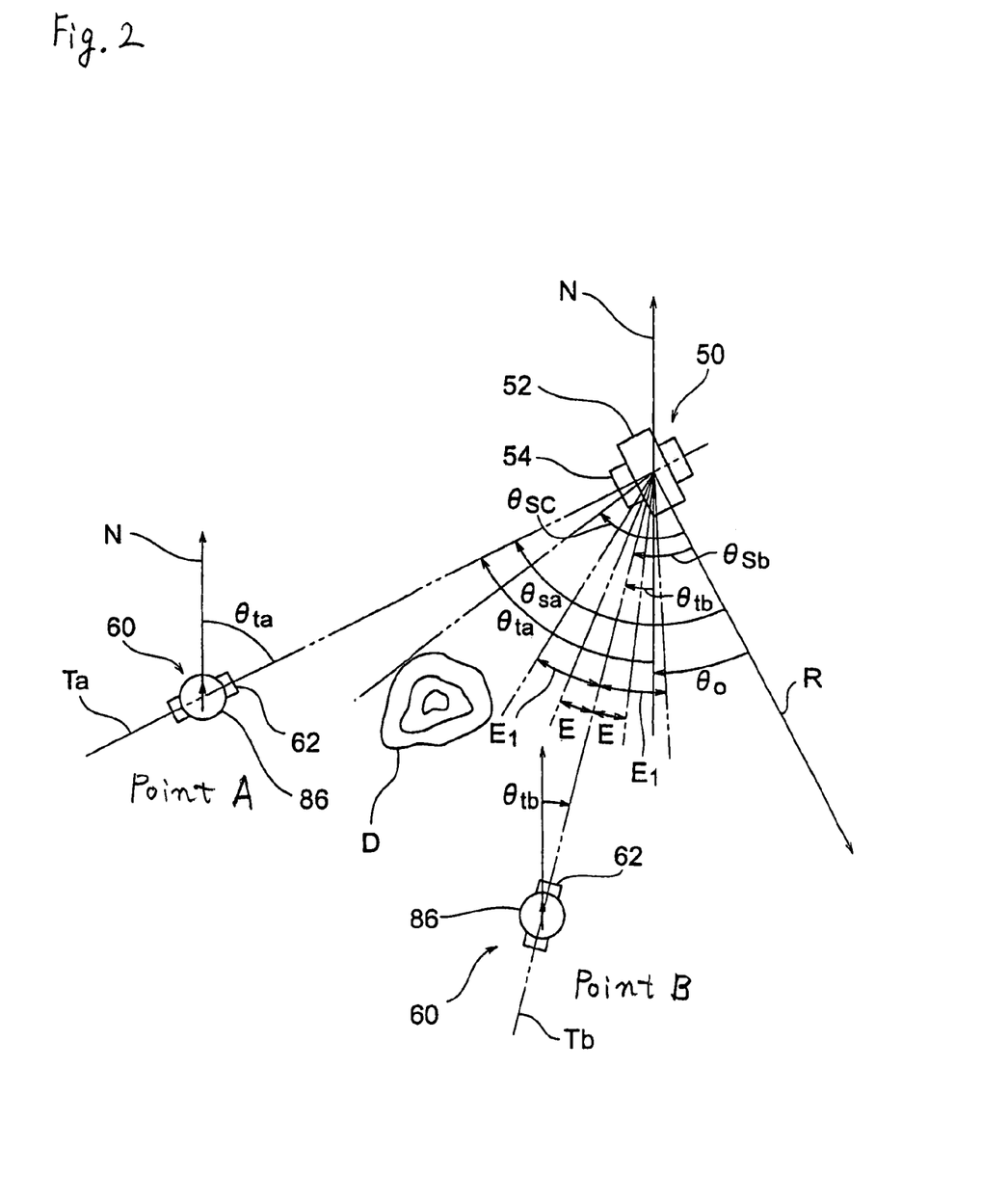
[FIG. 2] View for explaining the principle of the survey system.
Figure 3:
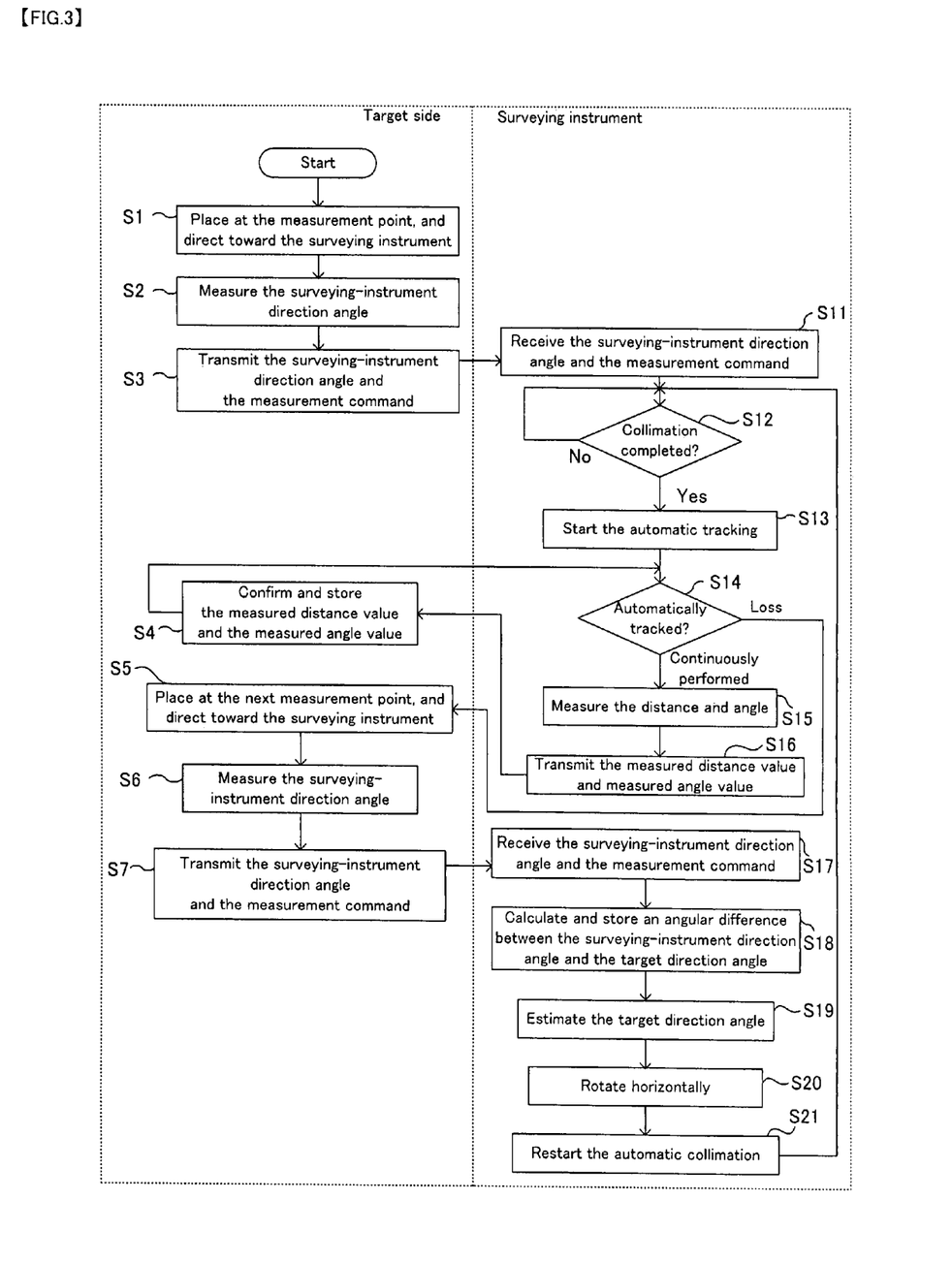
[FIG. 3] Flowchart for explaining the operation of the survey system.

A first embodiment of the present invention will now be described with reference to FIG. 1 to FIG. 3. FIG. 1 is a block diagram of the whole of a survey system in this embodiment. FIG. 2 is a view for explaining the principle of the survey system. FIG. 3 is a flowchart for explaining the operation of the body of a surveying instrument in the survey system.

Referring first to the block diagram of FIG. 1, a description will be given of the respective internal structures of a surveying instrument 50 and a target 60 that constitute the survey system.

The surveying instrument 50 includes a driving portion 101 that directs a collimation telescope 54 (see FIG. 2) toward a reflecting prism (retroreflector) 62, a measuring portion 109 that measures a horizontal angle and a vertical angle of the collimation telescope 54, a tracking light emitting portion 118 that emits tracking light 58 toward the reflecting prism 62, a tracking light receiver 120 that receives the tracking light 58 reflected by the reflecting prism 62, a memory portion 122 that stores data such as measured angle values, a central processing unit (CPU) 100 connected to the driving portion 101, to the tracking light emitting portion 118, to the measuring portion 109, to the tracking light receiver 120, and to the memory portion 122, and a transmitted-light receiving portion (not shown) used to calculate the distance between the reflecting prism 62 and the surveying instrument 50. Various commands and data can be input from an operating/inputting portion 124 to the central processing unit 100.

The driving portion 101 is made up of a horizontal motor 102 that horizontally rotates the instrument body, a vertical motor 106 that vertically rotates the collimation telescope 54, and a horizontal driving portion 104 and a vertical driving portion 108 that supply driving current to the motors 102 and 106, respectively. The measuring portion 109 is made up of a horizontal encoder 111 that horizontally rotates together with the instrument body, a vertical encoder 110 that vertically rotates together with the collimation telescope, a horizontal angle measuring portion 112 and a vertical angle measuring portion 116 that read rotation angles of the encoders 111 and 110, respectively, and a distance measuring portion (not shown). Either a pulse type distance measuring system or a phase difference type distance measuring system may be employed for the distance measuring portion.

By the way, the surveying instrument 50 has an automatic tracking device that keeps automatically directing the optical axis (collimation axis) of the collimation telescope 54 toward the reflecting prism 62 even when the target 60 is moved. The automatic tracking device is made up of the central processing unit 100, the tracking light emitting portion 118, the tracking light receiver 120, and the driving portion 101. The automatic tracking device controls the driving portion 101 so that, by emitting the tracking light 58 from the tracking light emitting portion 118 and by allowing the tracking light receiver 120 to receive the tracking light 58 reflected and returned from reflecting prism 62, the central processing unit 100 determines the direction of the reflecting prism 62 in accordance with the movement of the reflecting prism 62, and the optical axis of the collimation telescope 54 is always directed toward the reflecting prism 62. The optical axis of the automatic tracking device and the optical axis of the optical system of the distance measuring portion are coaxial.

On the other hand, the target 60 has a central processing unit 80 in addition to the reflecting prism 62. A wireless device 72, an operating/inputting portion 82 used to input various commands and data, a display portion 84 used to display a state of the target 60 or the surveying instrument 50, and a memory portion 88 used to store various data or the like are connected to the central processing unit 80.

The target 60 includes a direction angle sensor (azimuth angle sensor) 86 that measures a direction angle (azimuth angle) at which the reflecting prism 62 is directed. The central processing unit (CPU) 80 is connected to the direction angle sensor 86. Whenever the distance and the angle are measured by moving the target 60, a measurement command signal including values measured by the direction angle sensor 86 is transmitted to the surveying instrument 50 by radio 65 through the wireless device 72. Likewise, the surveying instrument 50 is provided with a wireless device 70 connected to the central processing unit 80, and, when a measurement command signal is received from the target 60, the distance and the angle can be measured while automatically collimating the reflecting prism 62. Besides this, the target 60 and the surveying instrument 50 can exchange various data and commands with each other by radio 65.

A magnetic sensor that outputs a direction angle by detecting terrestrial magnetism is used as the direction angle sensor 86. The direction angle (azimuth angle) is measured at a clockwise angle based on the magnetic north. An example of this type of magnetic sensor is disclosed by Japanese Published Unexamined Patent Application No. H9-329441 filed by the present applicant. An azimuth angle sensor that uses a hall device may be used as the direction angle sensor 86. Additionally, any sensor can be used as the azimuth angle sensor 86 if the sensor is a direction-angle detectable sensor such as a gyro that always maintains a constant posture or a wireless direction finder that detects the incoming direction of radio waves emitted from a fixed radio source such as a broadcasting station.

Next, the principle of the survey system will be described with reference to FIG. 2. When the target 60 having the reflecting prism 62 is directed toward the surveying instrument 50 at point "A" as shown in FIG. 2, the direction angle sensor 86, such as a magnetic sensor, measures a surveying-instrument direction angle (azimuth angle) $\theta$ta between the direction in which the reflecting prism 62 (hereinafter, the reflecting prism 62 is referred to as the target 60 because the reflecting prism 62 is the main element of the target 60) is directed and the direction N of the magnetic north. On the other hand, on the side of the surveying instrument 50, in order to measure a direction angle, a reference direction R is first determined so as to coincide with the direction of a suitable object, the instrument body 52 is then horizontally rotated, the target 60 is then collimated while vertically rotating the collimation telescope 54, and the horizontal angle of the collimation telescope 54 is measured. As a result, a target direction angle (azimuth angle) $\theta$sa, which indicates the direction Ta of the target 60 based on the reference direction R, is obtained. Accordingly, an angular difference $\theta_0 = \theta ta - \theta sa$ between the surveying-instrument direction angle $\theta$ta and the target direction angle $\theta$sa becomes equal to an angle between the magnetic-north direction N and the reference direction R. As a matter of course, this angular difference $\theta_0 = \theta ta - \theta sa$ should be always constant.

Thereafter, the target 60 is moved from point "A" to point "B," the target 60 is then directed toward the surveying instrument 50, and the surveying-instrument direction angle $\theta$tb is measured by the direction angle sensor 86. As a result, the target direction angle $\theta$sb that indicates the direction Tb of the target 60 placed at point "B" becomes equal to the sum of the angular difference $\theta_0$ and the surveying-instrument direction angle $\theta$tb measured at point "B." Therefore, an estimated target direction angle $\theta$sb can be expressed as $\theta sb = \theta_0 + \theta tb$.

Accordingly, the surveying instrument 50 determines the rotational direction of the instrument body 52 by a smaller angular difference selected from between a clockwise angular difference and a counterclockwise angular difference, i.e., by an angular difference $\theta sa - \theta sb$ or $\theta sc - \theta sb$ between the present direction angle (which is $\theta$sa if automatic tracking is not performed and which is $\theta$sc if automatic tracking is stopped because of an obstacle D or the like) at which the collimation telescope 54 is directed and the estimated target direction angle $\theta$sb. To do so, it is recommended to calculate the angular difference $\theta sa - \theta sb$ or $\theta sc - \theta sb$ with the estimated target direction angle $\theta$sb either clockwise or counterclockwise, and, if the angular difference is less than 180°, determine the rotational direction of the instrument body 52 to be the present direction, and, if the angular difference exceeds 180°, determine the rotational direction of the instrument body 52 to be the other direction. Thereafter, it is recommended to rotate the instrument body 52 in the determined rotational direction by the estimated target direction angle $\theta$sb. Since the instrument body 52 is directed toward the target 60 thereby, the surveying instrument 50 can swiftly find the target 60, and the measurement can be ended in a short time.

However, it is conceivable that each of the surveying-instrument direction angles $\theta$ta and $\theta$tb includes an error angle resulting from the influence of a surrounding magnetic substance produced by the fact that a magnetic sensor is used as the direction angle sensor 86 or resulting from difficulty in directing the target 60 exactly toward the surveying instrument 50 by eye measurement. Therefore, there is a need to search the target 60 to the range of the error angle E on both sides of the estimated target direction angle $\theta$sb. Additionally, to reliably find the target 60, the target 60 may be searched in consideration of an enlarged error angle E1 on both sides of the estimated target direction angle $\theta$sb.

Referring now to the flowchart of FIG. 3, the operation of the survey system will be described in detail.

When the survey system is started, an operator first places the target 60 at a measurement point and directs the target 60 toward the surveying instrument 50 by eye measurement at step S1. The process then proceeds to step S2, at which the central processing unit 80 allows the direction angle sensor 86 to measure the surveying-instrument direction angle θta. The process then proceeds to step S3, at which the central processing unit 80 transmits a measurement starting command including the surveying-instrument direction angle θta to the surveying instrument 50. Herein, step S3 executed by the central processing unit 80 corresponds to the measurement command means of the present invention.

The surveying instrument 50 automatically performs operations described later by the central processing unit 100. The surveying instrument 50 receives the measurement command at step S11, and the process then proceeds to step S12, at which the target 60 is automatically collimated. When the collimation is completed, the process proceeds to step S13, at which the target 60 starts to be automatically tracked. The process then proceeds to step S14, at which it is confirmed that the target 60 is being automatically tracked. Herein, if the automatic tracking is being continuously performed, the process proceeds to step S15, at which the distance, the target direction angle θsa, and the target height angle are measured, and the target direction angle θsa and the surveying-instrument direction angle θta transmitted from the target 60 are stored in the memory portion 122. Herein, step S15 executed by the central processing unit 100 corresponds to the measurement means of the present invention. The process then proceeds to step S16, at which measured values of the distance values, the angle values, etc., are transmitted to the target 60.

Accordingly, the operator confirms the measured values of the distance values, the angle values, etc., displayed on the display portion 84 and moves the target 60 to the next measurement point at step S4 executed on the side of the target 60. The process then returns to step S14 executed on the side of the surveying instrument. If the automatic tracking is being continuously performed, the measuring operation can be performed at once. Subsequently, steps S14, S15, S16, and S4 can be repeatedly executed, and the measuring operation can be continuously performed as long as the target 60 is being automatically tracked. If necessary, the measured values can be stored in the memory portion 88.

On the other hand, on the side of the surveying instrument 50, if it is confirmed that target loss (tracking error) has occurred because of an obstacle D or the like at step S14, the automatic tracking is stopped, and waiting is performed in that state.

However, on the side of the target 60, the operator moves to the next measurement point while bringing the target 60 and places the target 60 there regardless of whether the target loss of the surveying instrument 50 has occurred or not. The operator directs the target 60 toward the surveying instrument 50 by eye measurement. The process then proceeds to step S6, at which the central processing unit 80 allows the direction angle sensor 86 to measure the surveying-instrument direction angle θtb. The process then proceeds to step S7, at which a measurement command including the surveying-instrument direction angle θtb is transmitted to the surveying instrument 50. Herein, step S7 executed by the central processing unit 80 corresponds to the measurement command means of the present invention.

When the surveying instrument 50 receives the measurement command including the surveying-instrument direction angle θtb at step S17, the process proceeds to step S18, at which an angular difference $\theta_o$ between the surveying-instrument direction angle θta and the target direction angle θsa obtained at the last measurement is calculated and stored. Concerning the angular difference $\theta_o$, one of the angular differences $\theta_o$ obtained and stored at the previous measurements is used. However, since a magnetic sensor is used as the direction angle sensor 86, the surveying-instrument direction angles θta and θtb are great in error. Therefore, it is permissible to calculate an angular difference $\theta_o$ between the surveying-instrument direction angle θta and the target direction angle θsa whenever measurement is performed and to use a suitable representative value such as the average $\theta_o$ mean of the angular differences $\theta_o$ or a weighted average that excludes the influence of measured values extremely deviating from the average. Additionally, it is permissible to exclude measured values extremely deviating from the average as a measuring miss and calculate a representative value thereof. Herein, step S18 executed by the central processing unit 100 corresponds to the angular-difference calculating means of the present invention.

The process then proceeds to step S19, at which an estimated target direction angle θsb is calculated. In doing so, the estimated target direction angle θsb is obtained as the sum $\theta_o+\theta tb$ of the angular difference $\theta_o$ and the surveying-instrument direction angle θtb by using the angular difference $\theta_o$ between the surveying-instrument direction angle θta and the target direction angle θsa obtained at the last measurement and by using the surveying-instrument direction angle θtb transmitted from the target 60 at the present measurement. Herein, step S19 executed by the central processing unit 100 corresponds to the target-direction-angle estimating means of the present invention.

The process then proceeds to step S20, at which the rotational direction of the instrument body 52 is determined by an angular difference θsc−θsb between the present direction angle θsc at which the instrument body 52 is directed and the estimated target direction angle θsb, i.e., by a smaller angular difference selected from between a clockwise angular difference and a counterclockwise angular difference. The horizontal motor 102 is driven, and the instrument body 52 is rotated until the instrument body 52 is directed in the direction of the estimated target direction angle θsb. Herein, step S20 executed by the central processing unit 100 corresponds to the rotation means of the present invention.

The process then proceeds to step S21, at which automatic collimation is restarted. At this time, the target 60 is searched within the range of the error angle E on both sides of the estimated target direction angle θsb. If the surveying instrument 50 cannot find the target 60 in this way, the target 60 is further searched within the range of the enlarged error angle E1 on both sides of the estimated target direction angle θsb. In most cases, a satisfactory operation can be performed if the error angle E is about 35°, and the enlarged error angle E1 is about 75°.

If the surveying instrument 50 finds the target 60 in this way, the process returns to step S12. Steps S12 to S21 are repeatedly executed in the subsequent process, and all scheduled measurement points are measured.

According to this embodiment, when the target 60 is moved from point "A" to point "B," the estimated target direction angle θsb of the target 60 placed at point "B" can be calculated even if the surveying instrument 50 loses sight of the target 60, so that the automatic tracking is stopped. Therefore, the instrument body 52 can be immediately directed toward the target 60, and the measurement can be finished in a short time by finding the target 60 swiftly. Additionally, since an operator does not need to pay close attention so that the surveying instrument 50 does not lose sight of the target 60, a burden imposed on the operator becomes extremely small. Moreover, the surveying instrument 50 rotates the instrument body 52 by a minimum rotation angle by selecting a smaller angular difference from between the clockwise angular difference and the counterclockwise angular difference, so that the target 60 can be caught by that minimum rotation angle. Therefore, the time required for the measurement can be made even shorter.

Since the target 60 is searched within the range of the error angles E and E1 provided on both sides of the estimated target direction angle θsb, the direction angle sensor 86 does not need to have high accuracy, and the target 60 is not required to be directed exactly toward the surveying instrument 50 at the measurement. A satisfactory operation can be performed even if the target 60 is directed roughly toward the surveying instrument 50 at the measurement.

Figure 4:
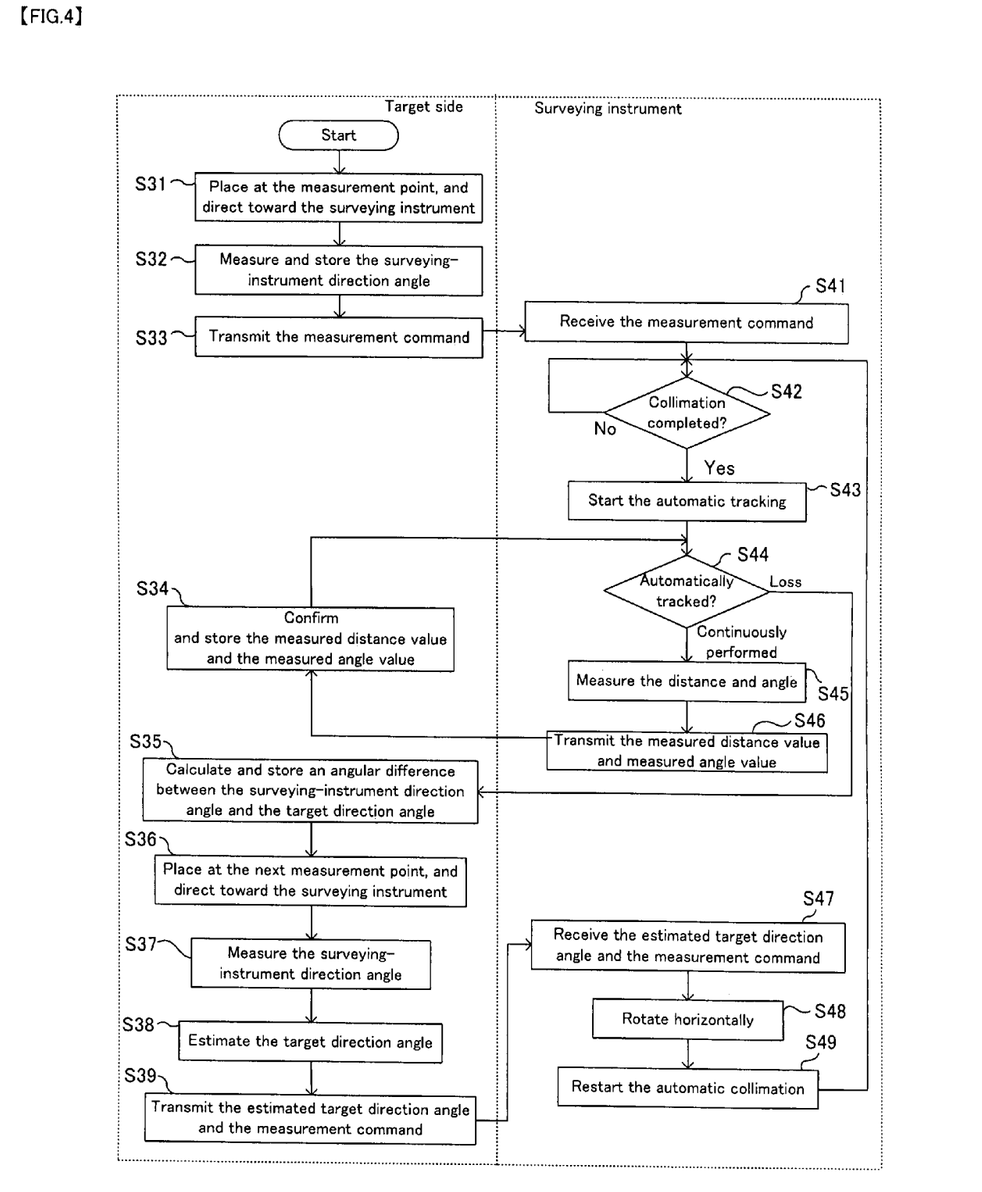
[FIG. 4] Flowchart for explaining the operation of the survey system according to the second embodiment of the present invention.

A second embodiment will now be described with reference to FIG. 4. The block diagram of the survey system has the same structure as in the first embodiment of FIG. 1, but differs from that of the first embodiment in the operation of the survey system executed by the central processing unit 100 of the surveying instrument 50 and the central processing unit 80 of the target 60. In the first embodiment, the estimated target direction angle θsb is calculated on the side of the surveying instrument 50. However, in the second embodiment, the estimated target direction angle θsb is calculated on the side of the target 60. The operation of this survey system will be hereinafter described with reference to the flowchart of FIG. 4.

When the survey system is started, an operator first places the target 60 at a measurement point and directs the target 60 toward the surveying instrument 50 at step S31. The process then proceeds to step S32, at which the central processing unit 80 allows the direction angle sensor 86 to measure the surveying-instrument direction angle θta and allows the memory portion 88 to store this direction angle θta. The process then proceeds to step S33, at which the central processing unit 80 transmits a measurement command to the surveying instrument 50.

The surveying instrument 50 automatically performs operations described later by the central processing unit 100. The surveying instrument 50 receives the measurement command at step S41, and the process then proceeds to step S42, at which the target 60 is automatically collimated. When the collimation is completed, the process proceeds to step S43, at which the target 60 starts to be automatically tracked. The process then proceeds to step S44, at which it is confirmed that the target 60 is being automatically tracked. Herein, if the automatic tracking is being continuously performed, the process proceeds to step S45, at which the distance, the target direction angle θsa, and the target height angle are measured. Herein, step S45 executed by the central processing unit 100 corresponds to the measurement means of the present invention. The process then proceeds to step S46, at which measured values of the distance values, the angle values, etc., are transmitted to the target 60. Herein, step S46 executed by the central processing unit 100 corresponds to the measured-value transmitting means of the present invention.

The operator confirms the measured values of the distance values, the angle values, etc., displayed on the display portion 84 and moves the target 60 to the next measurement point at step S34 executed on the side of the target 60. Simultaneously, the central processing unit 80 allows the memory portion 88 to store these measured values (which include the target direction angle θsa). The process then returns to step S44 executed on the side of the surveying instrument, and, if the automatic tracking is being continuously performed, the measuring operation can be performed at once. Subsequently, steps S44, S45, S46, and S34 can be repeatedly executed, and the measuring operation can be continuously performed as long as the target 60 is being automatically tracked.

On the other hand, on the side of the surveying instrument 50, if it is confirmed that target loss (tracking error) has occurred because of an obstacle D or the like at step S44, the automatic tracking is stopped, and waiting is performed in this state, and that effect is transmitted to the target 60 and is displayed on the display portion 84.

Accordingly, on the side of the target 60, an angular difference $\theta_o$ between the surveying-instrument direction angle θta and the target direction angle θsa obtained at the last measurement is calculated and stored at step S35. Concerning the angular difference $\theta_o$, one of the angular differences $\theta_o$ obtained and stored at the previous measurements is used. The angular difference $\theta_o$ may be calculated as a suitable representative value such as the average $\theta_o$ mean of the angular differences $\theta_0$ obtained whenever measurement is performed or a weighted average that excludes the influence of measured values extremely deviating from the average. Additionally, it is permissible to exclude measured values extremely deviating from the average as a measuring miss and calculate a representative value thereof. Herein, step S35 executed by the central processing unit 80 corresponds to the angular-difference calculating means of the present invention.

The process then proceeds to step S36, at which the operator moves to the next measurement point while bringing the target 60 and places the target 60 there regardless of whether the target loss of the surveying instrument 50 has occurred or not. The operator directs the target 60 toward the surveying instrument 50 by eye measurement. The process then proceeds to step S37, at which the central processing unit 80 allows the direction angle sensor 86 to measure the surveying-instrument direction angle θtb.

The process then proceeds to step S38, at which an estimated target direction angle θsb is calculated. In doing so, the estimated target direction angle θsb is obtained as the sum $\theta_o$+θtb of the angular difference $\theta_o$ and the surveying-instrument direction angle θtb by using the angular difference $\theta_o$ between the surveying-instrument direction angle θta and the target direction angle θsa obtained at the last measurement and by using the surveying-instrument direction angle θtb obtained at the present measurement. Herein, step S38 executed by the central processing unit 80 corresponds to the target-direction-angle estimating means of the present invention. The process then proceeds to step S39, at which a measurement command including the estimated target direction angle θtb is transmitted to the surveying instrument 50. Herein, step S39 executed by the central processing unit 80 corresponds to the measurement command means of the present invention.

The surveying instrument 50 receives the measurement command including the estimated target direction angle θsb at step S47, and the process then proceeds to step S48, at which the rotational direction of the instrument body 52 is determined by an angular difference θsc−θsb between the present direction angle θsc at which the instrument body 52 is directed and the estimated target direction angle θsb, i.e., by a smaller angular difference selected from between the clockwise angular difference and the counterclockwise angular difference. The horizontal motor 102 is driven, and the instrument body 52 is rotated until the instrument body 52 is directed in the direction of the estimated target direction angle θsb. Herein, step S48 executed by the central processing unit 100 corresponds to the rotation means of the present invention.

The process then proceeds to step S49, at which automatic collimation is restarted. If the surveying instrument 50 cannot find the target 60 immediately after starting the automatic collimation, the target 60 is searched within the range of the error angle E provided on both sides of the estimated target direction angle θsb in the same way as in the first embodiment. If the surveying instrument 50 cannot find the target 60 in spite of having executed that step, the target 60 is further searched within the range of the enlarged error angle E1 provided on both sides of the estimated target direction angle θsb.

If the surveying instrument 50 finds the target 60, the process returns to step S43. Steps S42 to S49 are repeatedly executed in the subsequent process, and all scheduled measurement points are measured. In this embodiment, the same effect as in the first embodiment is fulfilled.

The present invention is not limited to the above embodiments. For example, various modifications can be carried out as follows.

In the above embodiments, the automatic tracking type surveying instrument 50 is used. However, the present invention is applicable to a surveying instrument having no tracking function if an automatic collimator is incorporated into the surveying instrument.

In the above embodiments, the target 60 is searched by the automatic tracking device as soon as the instrument body 52 is directed roughly in the direction of the estimated target direction angle θsb. However, the measurement may be performed as follows. In detail, the target 60 is provided with a guide light transmitter that emits guide light indicating the direction of the target, whereas the surveying instrument 50 is provided with a direction detector that detects the direction of the target by receiving the guide light. When the instrument body 52 is directed roughly in the direction of the estimated target direction angle θsb, guide light is emitted from the target 60, and is received by the direction detector of the surveying instrument. The automatic tracking is started after further bringing the collimation telescope 54 close to the direction of the target 60. In this case, the time taken until the measurement is completed can be made even shorter. The guide light may be a beam of simple diffused light, and, if a fan-shaped beam of guide light is used for scanning, the guide light can be transmitted to a large area, and hence the surveying instrument 50 can easily find the target 60.

DESCRIPTION OF THE SYMBOLS

50 Surveying instrument
52 Instrument body
60 Target
62 Retroreflector (reflecting prism, target)
80, 100 Central processing unit
86 Direction angle sensor
112 Horizontal angle measuring portion (angle measuring means)
$\theta_o$ Angular difference between surveying-instrument direction angle and target direction angle
$\theta ta$, $\theta tb$ Surveying-instrument direction angle
$\theta sa$, $\theta sb$, $\theta sc$ Target direction angle

The invention claimed is:

1. A survey system comprising a target and a surveying instrument that automatically tracks or collimates the target, the target comprising: a direction angle sensor that measures a surveying-instrument direction angle obtained when the target is directed toward the surveying instrument; and a measurement command means for transmitting the surveying-instrument direction angle and a measurement command to the surveying instrument,
the surveying instrument comprising: an angle measuring means for measuring a target direction angle that indicates a direction of the target; a measurement means for automatically collimating the target and performing measurement when the measurement command is received; an angular-difference calculating means for calculating an angular difference between the surveying-instrument direction angle and the target direction angle; a target-direction-angle estimating means for calculating an estimated target direction angle from the angular difference calculated at last measurement and from the surveying-instrument direction angle transmitted from the target at present measurement; and a rotation means for directing a body of the surveying instrument in a direction of the estimated target direction angle.

2. A survey system comprising a target and a surveying instrument that automatically tracks or collimates the target, the target comprising: a direction angle sensor that measures a surveying-instrument direction angle obtained when the target is directed toward the surveying instrument; an angular-difference calculating means for calculating an angular difference between the surveying-instrument direction angle and a target direction angle that indicates a direction of the target-transmitted from the surveying instrument; a target-direction-angle estimating means for calculating an estimated target direction angle from the angular difference calculated at last measurement and from the surveying-instrument direction angle obtained when the target is directed toward the surveying instrument at present measurement; and a measurement command means for transmitting a measurement command including the estimated target direction angle to the surveying instrument,
the surveying instrument comprising: an angle measuring means for measuring a target direction angle; a measurement means for automatically collimating the target and performing measurement when the measurement command is received; a measured-value transmitting means for transmitting the target direction angle to the target; and a rotation means for directing a body of the surveying instrument in a direction of the estimated target direction angle.

3. The survey system as described in claim 1 or 2, wherein the rotation means determines a rotational direction having a smaller angular difference selected from between a clockwise angular difference and a counterclockwise angular difference, concerning a present direction angle at which the body of the surveying instrument is directed and the estimated target direction angle.

4. The survey system as described in claim 1 or 2, wherein the angular-difference calculating means calculates a representative value of angular differences that have hitherto been obtained whenever the angular differences are calculated, and the target-direction-angle estimating means uses the representative value as the angular difference.

5. The survey system as described in claim 1 or 2, wherein the target includes a guide light transmitter that emits guide light indicating a direction of the target, and the surveying instrument includes a direction detector that detects the direction of the target by receiving the guide light.

6. The survey system as described in claim 1 or 2, wherein the direction angle sensor is a magnetic sensor.

* * * * *